(12) United States Patent
Engel et al.

(10) Patent No.: US 8,066,109 B2
(45) Date of Patent: Nov. 29, 2011

(54) DEVICE FOR HANDLING DIAPERS

(75) Inventors: Gisbert Engel, Kirchlinteln-Luttum (DE); Henry Buse, Visselhövede (DE); Josef Schulte, Aschendorf (DE); Björn Brandhorst, Hörstel (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 116 days.

(21) Appl. No.: 12/529,415

(22) PCT Filed: Jan. 18, 2008

(86) PCT No.: PCT/EP2008/000374
§ 371 (c)(1),
(2), (4) Date: Sep. 1, 2009

(87) PCT Pub. No.: WO2008/107040
PCT Pub. Date: Sep. 12, 2008

(65) Prior Publication Data
US 2010/0107571 A1 May 6, 2010

(30) Foreign Application Priority Data
Mar. 5, 2007 (DE) .......................... 10 2007 010 990

(51) Int. Cl.
*B65G 47/51* (2006.01)

(52) U.S. Cl. ................... 198/347.1; 198/419.3; 198/778

(58) Field of Classification Search ............... 198/347.1, 198/404, 406, 408, 419.3, 778, 812
See application file for complete search history.

(56) References Cited

U.S. PATENT DOCUMENTS
4,768,642 A * 9/1988 Hunter ........................ 198/419.2
(Continued)

FOREIGN PATENT DOCUMENTS
DE       38 31 475 A1      9/1988
(Continued)

OTHER PUBLICATIONS
International Search Report based on corresponding International Application No. PCT/EP2008/000374 filed on Jan. 18, 2008.
(Continued)

*Primary Examiner* — Mark A Deuble
(74) *Attorney, Agent, or Firm* — Laurence P. Colton; Smith Risley Tempel Santos LLC

(57) ABSTRACT

A powerful throughput magazine of the 'first in first out' type is activated for the handling of diapers (10) or similar objects during the transport from a converter (13) to a packer (14), the diapers being transported as diaper groups (19) through said magazine. The magazine (15) comprises of an endless magazine conveyor (18) having transversely directed bars (20), wherein one diaper group (19) each is disposed between adjacent bars on the magazine conveyor (18) in an upright position. After removing the diapers (10) from the magazine (15), the diaper groups (19) are separated again, and the diapers are individually fed to the packer (14).

20 Claims, 8 Drawing Sheets

U.S. PATENT DOCUMENTS

Figure 1:
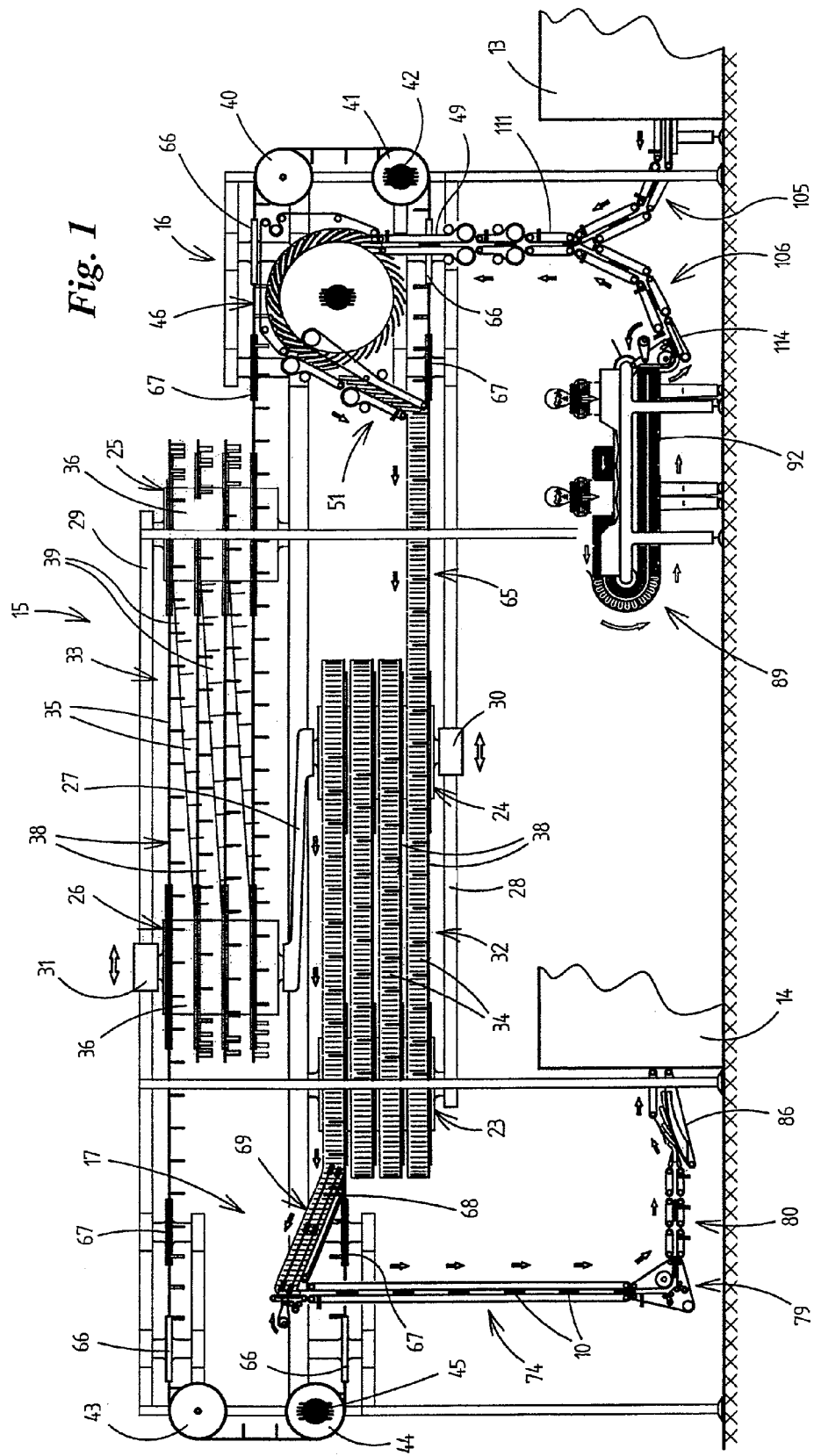

| | | | | |
|---|---|---|---|---|
| 5,291,985 | A * | 3/1994 | Spatafora et al. | 198/419.3 |
| 5,611,418 | A | 3/1997 | Helmstetter | |
| 5,884,749 | A * | 3/1999 | Goodman | 198/419.3 |
| 6,021,886 | A | 2/2000 | Remericq | |
| 6,422,380 | B1 * | 7/2002 | Sikora | 198/812 |
| 6,758,321 | B2 * | 7/2004 | Spettl | 198/347.1 |
| 6,913,132 | B2 * | 7/2005 | Spatafora | 198/347.1 |
| 7,455,168 | B2 * | 11/2008 | Monti | 198/347.1 |
| 7,900,766 | B2 * | 3/2011 | Takayama et al. | 198/419.3 |
| 2005/0016819 | A1 * | 1/2005 | Draghetti et al. | 198/347.2 |
| 2006/0185962 | A1 * | 8/2006 | Hartness et al. | 198/594 |

FOREIGN PATENT DOCUMENTS

| | | |
|---|---|---|
| DE | 101 23 327 C1 | 5/2001 |
| DE | 10 2004 028 205 B4 | 10/2006 |
| DE | 10 2005 034 770 A1 | 2/2007 |
| EP | 0 451 398 A | 10/1991 |
| EP | 0 551 613 A | 7/1993 |

OTHER PUBLICATIONS

German Search Report based on corresponding German application No. 10 2007 010 990.5 filed on Mar. 5, 2007.

* cited by examiner

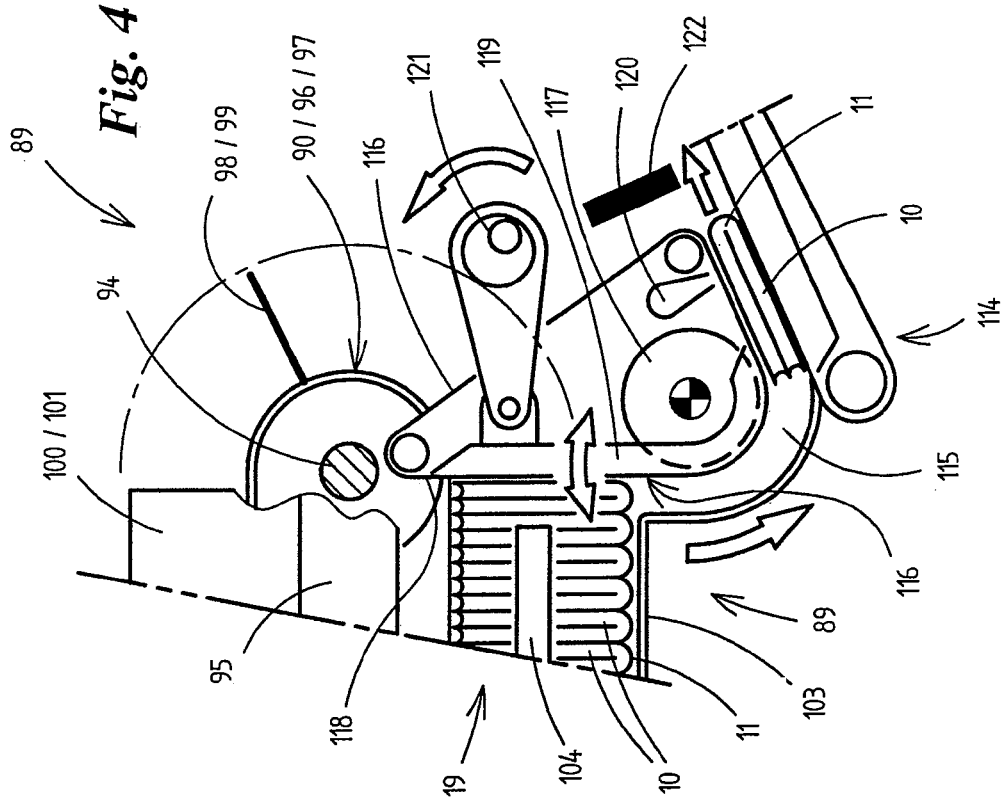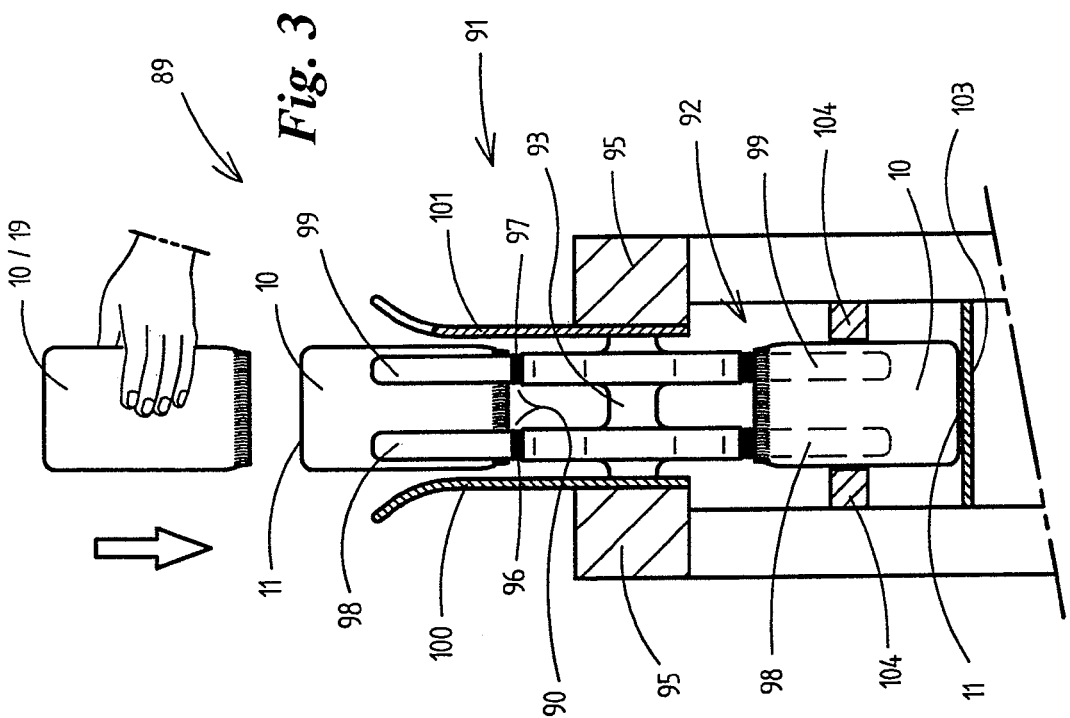

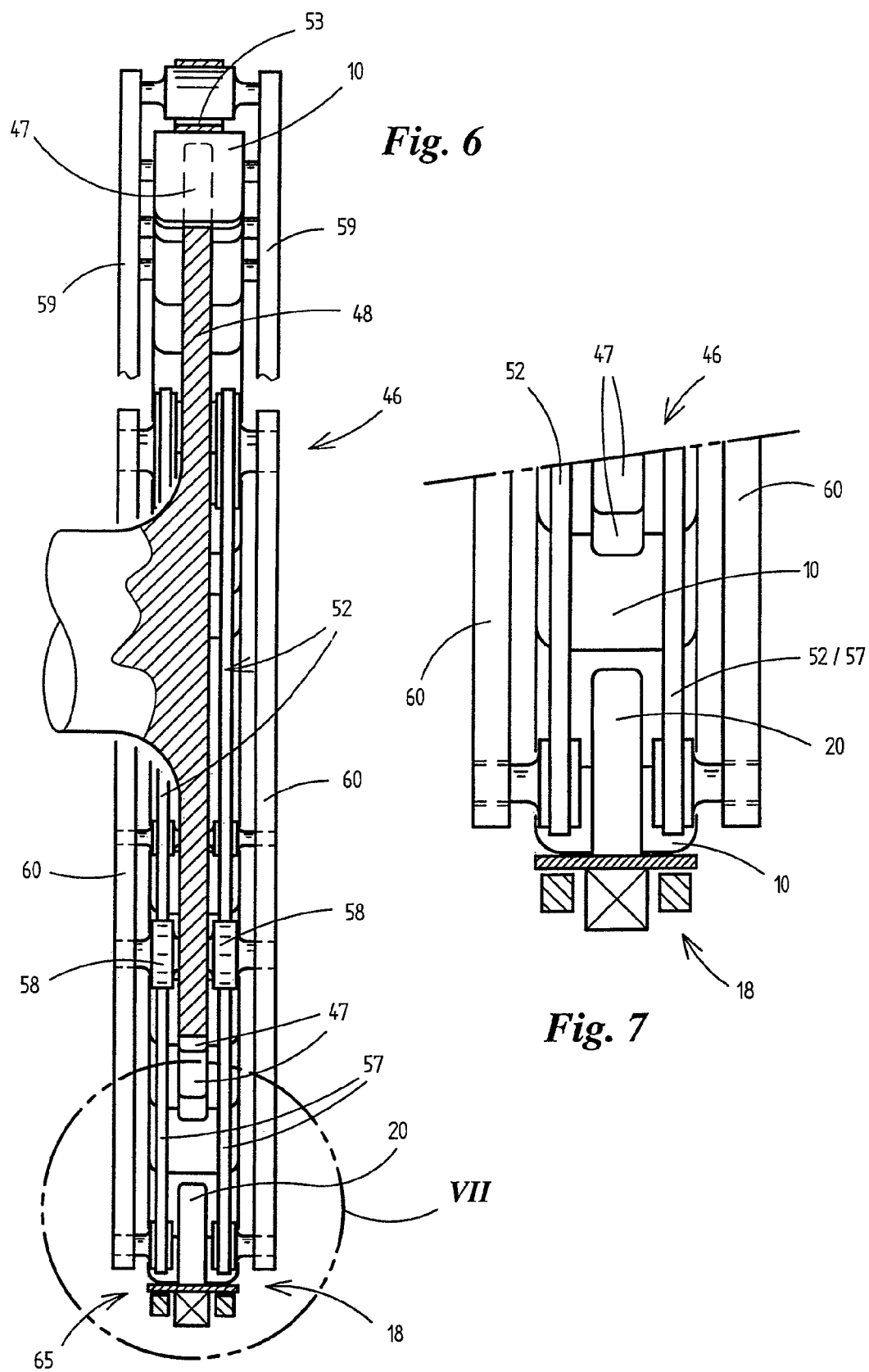

DEVICE FOR HANDLING DIAPERS

STATEMENT OF RELATED APPLICATIONS

This application is the U.S. National Phase Under Chapter II of the Patent Cooperation Treaty (PCT) of PCT International Application No. PCT/EP2008/000374 having an International Filing Date of 18 Jan. 2008, which claims priority on German Patent Application No. 10 2007 010 990.5 having a filing date of 5 Mar. 2007.

BACKGROUND OF THE INVENTION

1. Technical Field

The invention relates to a device for handling and transporting sheet-like articles, in particular diapers, which, coming from a production machine—converter—, can be supplied to a packaging machine for the packaging of groups of articles, in particular of diaper groups.

2. Related Art

This relates to the handling of sheet-like articles, of which the measurement in the third dimension is small in relation to the measurements of the other two dimensions. It relates, in particular, to the handling of diapers which are to be processed as flat structures with low dimensional stability. Diapers only are referred to below for the sake of simplicity.

BRIEF SUMMARY OF THE INVENTION

The object on which the invention is based is to propose measures for an efficient handling of diapers which are made available in large quantities by high-performance converters and are supplied to likewise high-performance packaging machines, along with optimal utilization with regard to manufacture and with regard to packaging.

To achieve this object, the device according to the invention is characterized in that, following the converter, the articles or diapers can be conveyed through a continuous-flow store, that is to say what is known as a first-in/first-out store, having a variable storage capacity.

The store performs the task of providing compensation between the converter and the packaging machine, so that the performance of these machines can be utilized optimally.

The store is tailored in its set-up and type of operation to the form and material-dependent particularities of the diapers. An (endless) conveyor or belt transports the diapers as diaper groups through the store between upright webs. The diapers are arranged in an upright position, placed close together within the respective diaper group, and are supported with one edge on the belt.

A further particularity is a back-up store which is arranged in the supply region of the store and which can be operated manually and makes it possible to supply diapers to the (main) store additionally or alternatively to the converter.

Furthermore, the transfer of the diapers to the store or main store is designed in a special way, to be precise with a collecting wheel for receiving the diapers supplied individually at high speed and at a distance from one another.

The diapers emerging from the store or main store are individually separated again and supplied to the packer successively at a distance from one another. In the region of the latter, new groups of diapers are produced, to be precise according to the capacity of the packs in each case to be produced.

Further particularities of the invention relate to the design of the main store and, above all, to the supply of the diapers to this and extraction from the main store.

BRIEF DESCRIPTION OF THE DRAWING FIGURES

Figure 2:
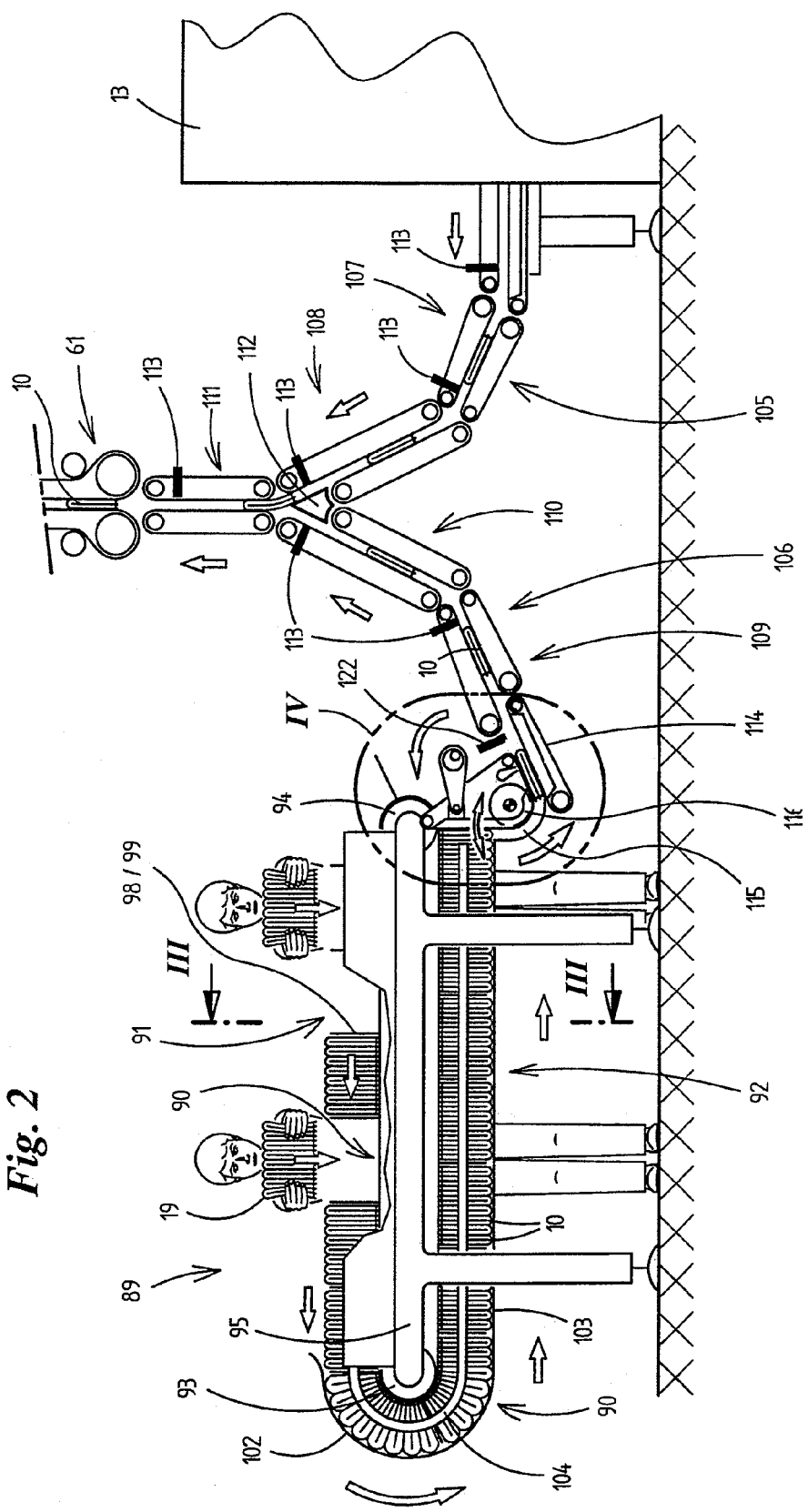
Figure 5:
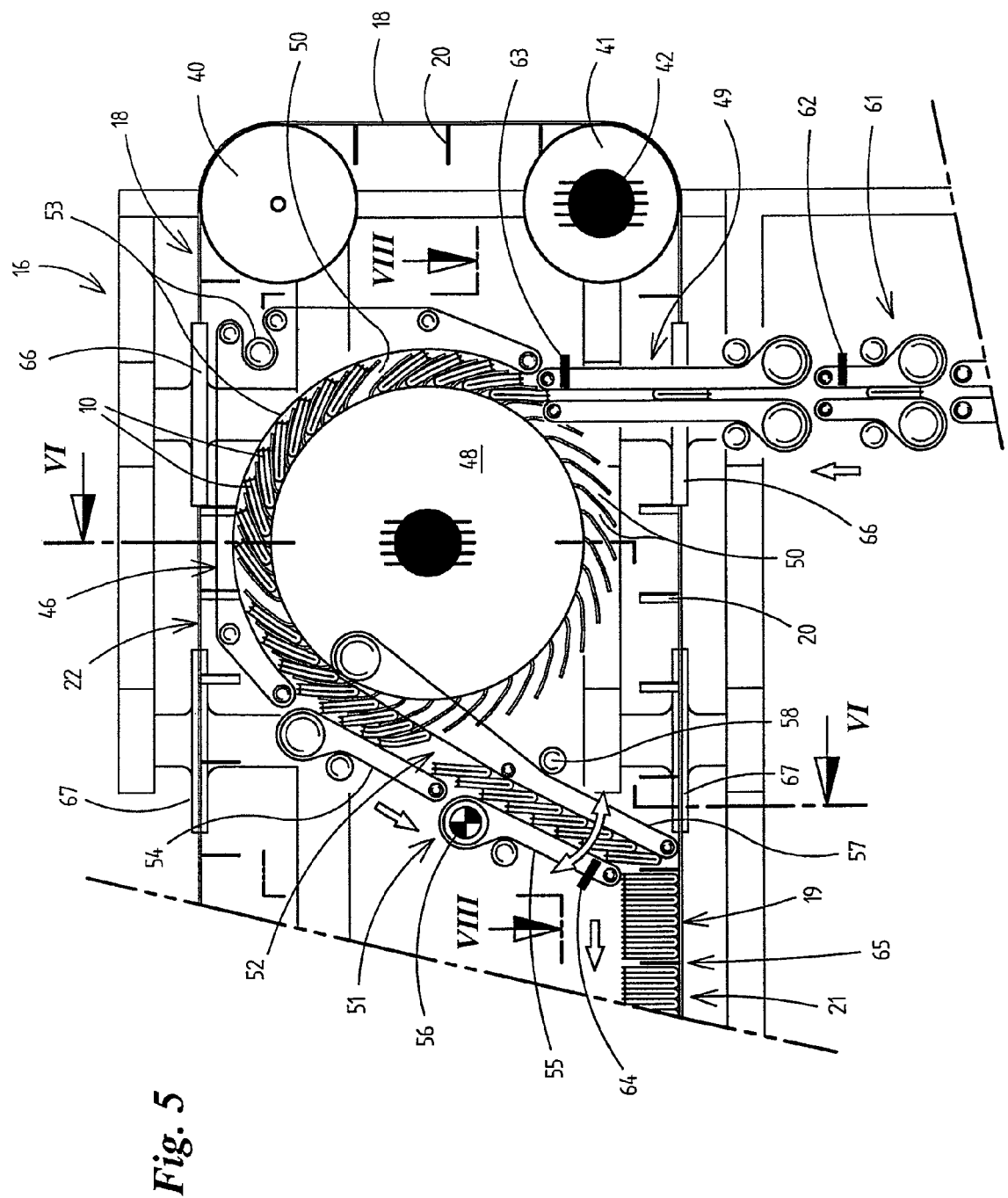
Figure 8:
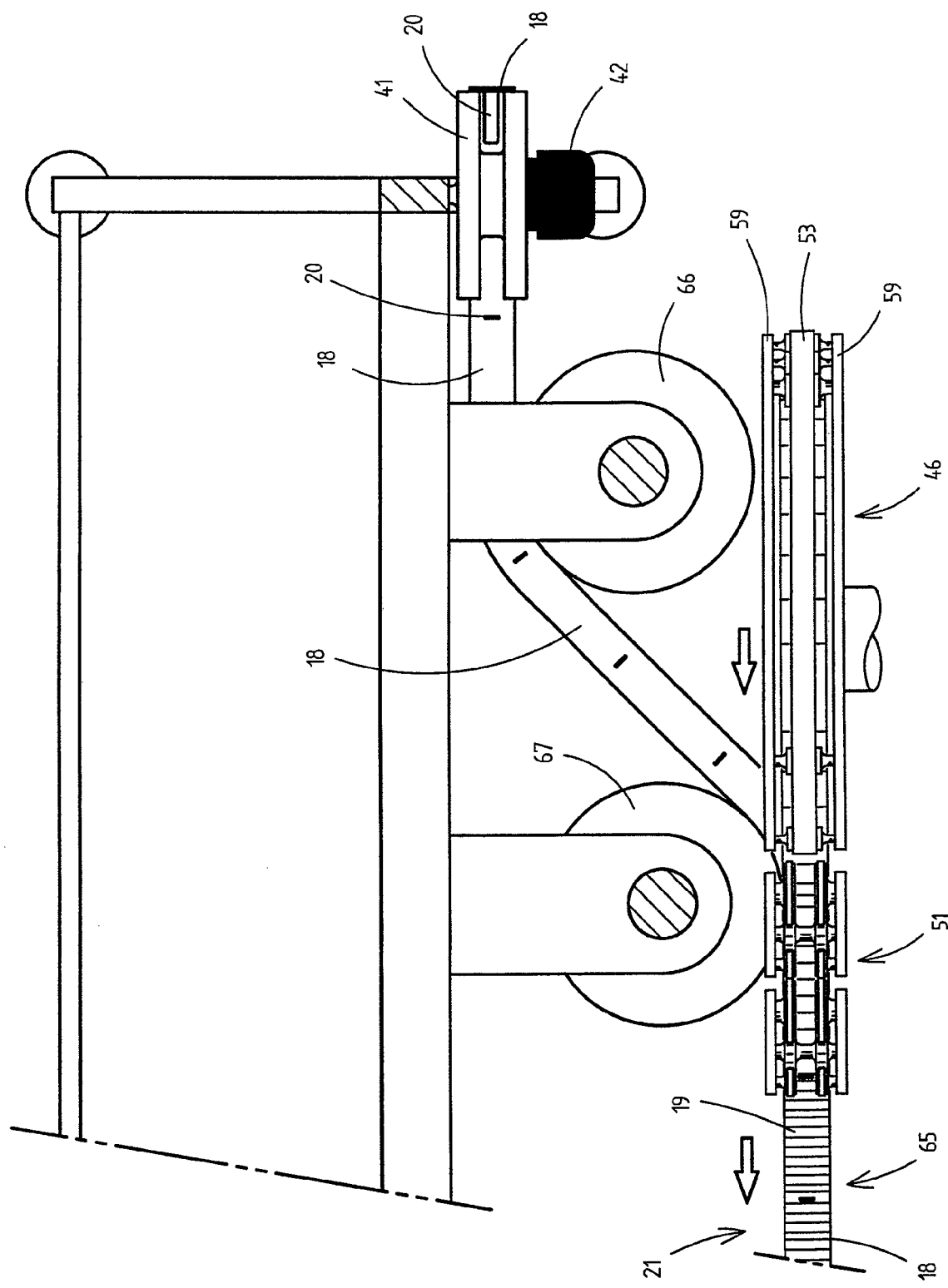
Figure 9:
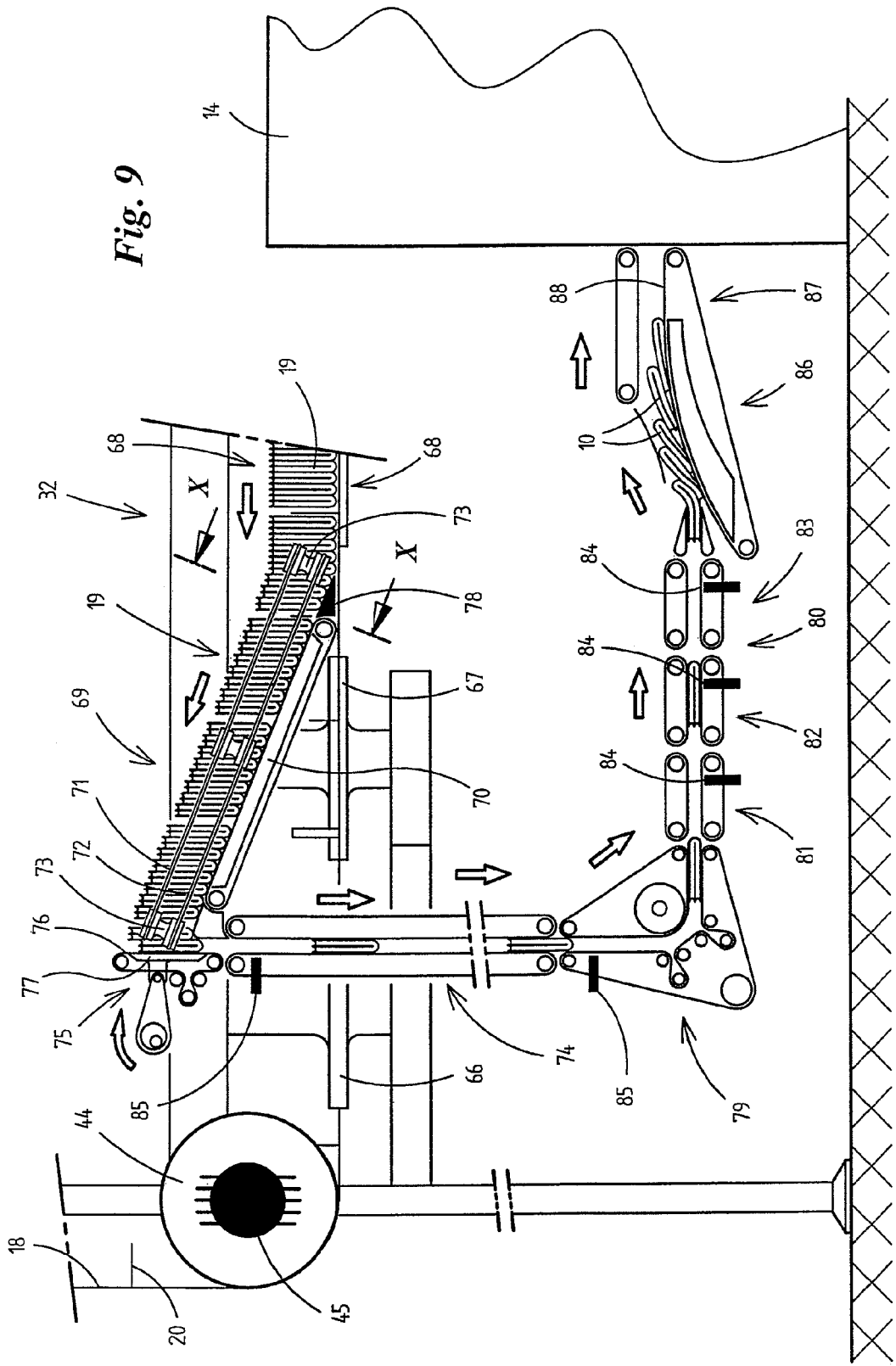
Figure 10:
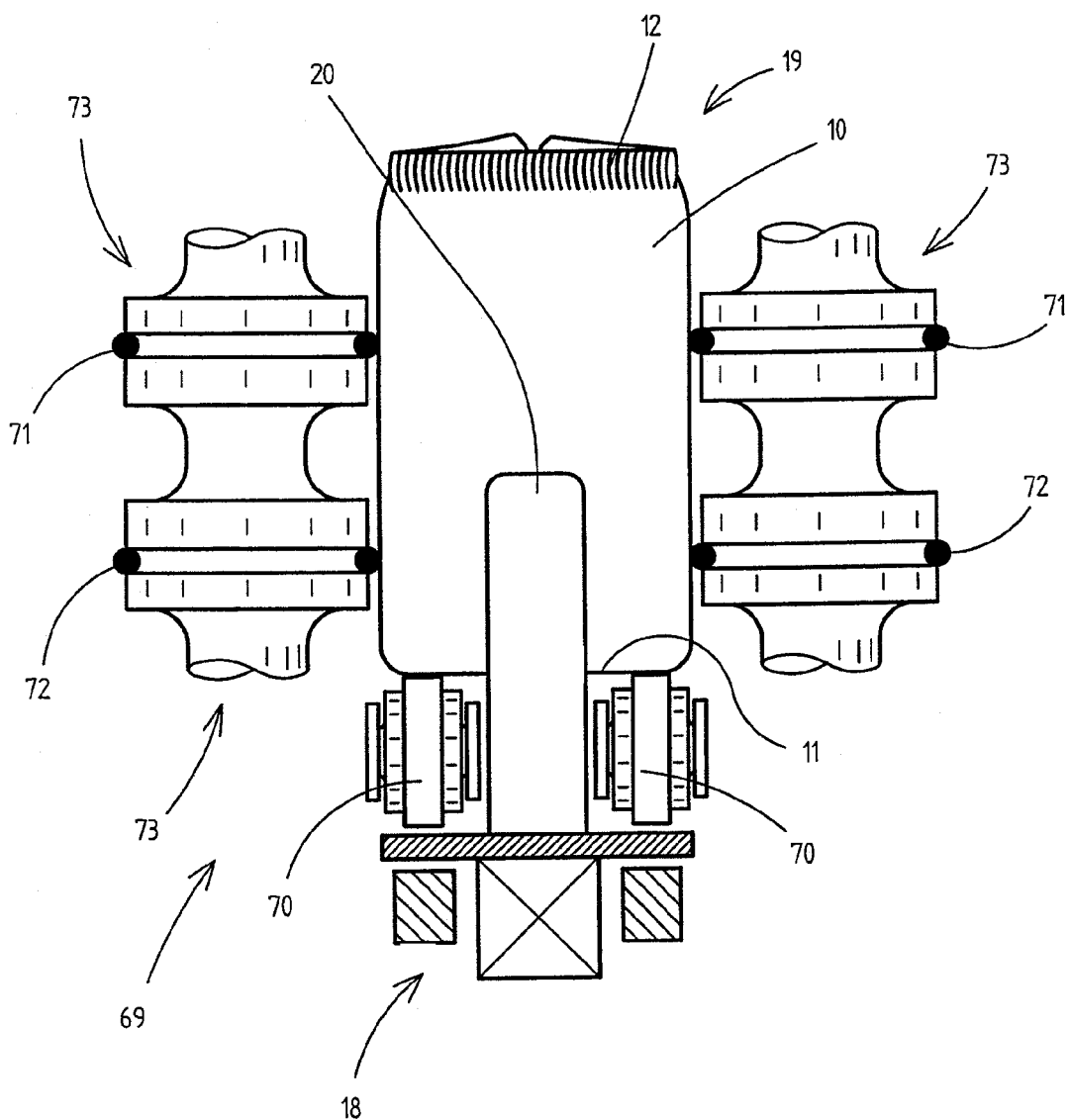

The device according to the invention and its type of operation are explained in more detail below by means of the drawings in which:

FIG. 1 shows the device for handling and transporting diapers in a diagrammatic side view, FIG. 2 shows a detail of the device according to FIG. 1, to be precise an additional or back-up store, likewise in a side view, on an enlarged scale, FIG. 3 shows the back-up store according to FIG. 2 in cross section in the sectional plane on a further-enlarged scale, FIG. 4 shows an extract IV of the detail according to FIG. 2 on an enlarged scale, FIG. 5 shows a detail of the (main) store in a side view in the entry region, FIG. 6 shows a cross section of the detail according to FIG. 5 in the sectional plane VI-VI of FIG. 5 on an enlarged scale, FIG. 7 shows an extract VII of the detail according to FIG. 6 on a further-enlarged scale, FIG. 8 shows the entry region of the (main) store in the horizontal section VIII-VIII of FIG. 5 and in a top view, FIG. 9 shows an exit region of the (main) store in a side view, and FIG. 10 shows a cross section in the region of a discharge conveyor in the sectional plane X-X of FIG. 9 on an enlarged scale.

DETAILED DESCRIPTION OF PREFERRED EMBODIMENTS

The main field of use, to be precise the handling of mechanically manufactured diapers 10, is explained with reference to the drawings. These diapers are made available in various dimensions and versions, but are of essentially sheet-like design. The diapers are folded and form two legs lying one against the other. This gives rise to a round edge 11 on an, in particular, topside and to two leg margins 12 on the opposite side.

The device, illustrated in simplified form, consists of a production machine for the diapers 10, that is to say a converter 13, of at least one packaging machine, that is to say a packer 14, and of at least one store arranged in terms of conveyance between the converter 13 and packer 14: the main store 15 in the following text. This is designed in a special way, to be precise as a continuous-flow store or first-in/first-out store of variable capacity. The diapers 10 pass in the region of an introduction station 16 into the main store 15 and leave the latter via a discharge conveyor station 17. The main store 15 can receive a relatively large number of diapers 10, specifically in the case of a variable capacity adaptable to the performances of the converter, on the one hand, and of the packer 14, on the other hand.

The store 15 consists essentially of an endless conveyor, to be precise a special storage band 18. This is designed such that a deflection in the plane of the band and transversely thereto is possible. In particular, the storage band 18 is designed as a Flex-Link chain conveyor system, for example in the SKF version.

The diapers 10 are conveyed in groups by the storage band 18, that is to say with diaper groups 19 being formed from a plurality of diapers 10 arranged closely next to one another. In each case a diaper group 19 is located between supporting members of the storage band 18 which are arranged at a distance from one another, to be precise between webs 20 which are upright or arranged transversely to the storage band 18. These have here a somewhat lower height than the corresponding dimension of the diapers 10. The distances between the webs 20 are tailored to an optimum capacity for diapers 10. Depending on the size of the diapers, the diaper group 19 may consist of different numbers of diapers 10.

The multiply deflected storage band 18 forms two portions, to be precise a conveying portion 21, which receives the diapers or diaper groups 19, and a return portion 22, which carries no diapers 10, that is to say runs empty. Both portions 21, 22 run via a number of deflection members in such a way that the portions 21, 22 have in each case a screw-like run in elongate turns. Each portion 21, 22 is assigned two deflection units 23, 24 and 25, 26 arranged at a distance from one another. The deflection units 23, 24, on the one hand, and 25, 26, on the other hand, which are assigned to one another in pairs can be moved correspondingly in relation to one another in order to vary the storage capacity. In the case of an increase in the distance between the deflection units 23, 24 assigned to the conveying portion 21, the storage capacity is increased, since the conveying portion 21 is lengthened and the return portion 22 is correspondingly shortened, to be precise by means of a reduction in the distance between the deflection units 25, 26.

In the present exemplary embodiment, the deflection unit 23, remote from the introduction station 16, of the conveying portion 21 is mounted stationarily, but rotatably. By contrast, the other deflection unit 24 is displaceable according to the double arrow in order to vary the distance from the deflection unit 23. Accordingly, the deflection unit 25 of the return portion 22 is fixed, while the deflection unit 26 is movable to and fro, correspondingly to the deflection unit 24. The movable deflection units 24 and 26 are connected to one another, specifically by means of a (rigid) arm 27. This adjoins the deflection units 24, 26 in each case in the region of upper and lower ends of shafts of the latter.

Storage units 32, 33 designed in this way, consisting of a conveying portion 21 and of a return portion 22, are arranged one above the other, the conveying portion 21 below the return portion 22. The fixed deflection units 23, 25 are mounted by means of a vertical rotary shaft on a carrying framework of the store, to be precise on a lower longitudinal bearer 28, on the one hand, and on an upper longitudinal bearer 29, on the other hand. The movable deflection units and 26 are movable on a rail, here on the longitudinal bearers 28, 29, by means of a guide, to be precise, in each case, a slide 30, 31.

The conveying portion 21, on the one hand, and the return portion 22, on the other hand, form with the assigned deflection units 23, 24, 25, 26 the two storage units 32, 33. Each storage unit 32, 33, variable in terms of the length of the storage band 18, consists of a plurality of turns, to be precise storage turns 34 and empty turns 35, which are arranged one above the other. These arise due to the deflection of the storage band 18 in the region of the deflection units 23, 24, 25, 26. Each of these deflection units 23, 24, 25, 26 consists of an upright, preferably cylindrical bearer 36 and of a plurality of deflection wheels 37, arranged one above the other, on each bearer 36. The deflection wheels 37 are directed transversely axially with respect to the bearer 36 or horizontally, so that the storage band 18 is guided horizontally in the region of the deflection units 23, 24, 25, 26. Furthermore, a band portion 38 is guided horizontally from one deflection unit 23, 25 to the other deflection unit 24, 26. On the opposite side of the storage unit 32, 33, an obliquely directed band portion 39 is formed, which causes the transition from one deflection wheel 37 to a next higher or lower deflection wheel 37 of the other storage unit in each case.

Outside the region of the storage units 32, 33, an empty portion of the storage band 18 is guided via deflection wheels 40, 41 in the region of the introduction station 16. These deflecting wheels 40, 41 are arranged one above the other with horizontal axes of rotation. The return portion 24 is steered, after leaving the upper storage unit 33, via the upper deflection wheel 40 to the lower deflection wheel 41 and from this back into a horizontal lower loading plane. The deflecting wheel 41 is provided with a drive, here with a servomotor 42.

On the opposite side, to be precise in the region of the discharge conveyor station 17, deflecting wheels 43, 44 are likewise arranged one above the other. By means of these, the emptied storage band 18 emerging from the storage unit 32 is deflected upward onto the plane of the upper empty turn 35 of the storage unit 33. The deflecting wheel 44 can likewise be driven by means of a servomotor 45.

The transfer of the diapers 10 to the store 15 is solved in a special way. The diapers 10, supplied individually, at a distance from one another and at relatively high speed, are received by a collecting member and are transferred in close formation, so as to form the diaper groups 19, onto the storage band 18. The collecting member is a collecting wheel 46 which rotates in a vertical plane and which is provided with a multiplicity of receptacles, each for a diaper 10, along the circumference. The receptacles are formed by web-like partitions 47 which are arranged on the circumference of the collecting wheel 46, to be precise on the circumference of a wheel disk 48, at distances from one another which correspond approximately to the dimensions (thickness) of a diaper 10. The slightly curved partitions 47 are directed obliquely, that is to say at an acute angle, to the circumference of the wheel disk 48, so as to point rearwardly in the direction of rotation of the collecting wheel 46.

The diapers 10 are supplied to the collecting wheel 46 from below, that is to say by means of an upwardly directed movement. A transfer conveyor 49 is directed approximately tangentially to the collecting wheel 46. The transfer conveyor 49, consisting of two parallel belts, terminates directly in the region of the collecting wheel 46, in such a way that the diapers 10 are introduced in each case into a downwardly directed pocket 50 formed between the partitions 47. On account of the direction of rotation of the collecting wheel 46, the diapers 10 are first moved upward and, during the subsequent downward movement, are transferred to an intermediate conveyor 51. This takes over the diapers 10 from the collecting wheel 46, in that the diapers 10 run in succession onto a supporting belt 52 which lifts the diapers out of the pockets 50 on account of the rotational movement of the collecting wheel 46.

The diapers 10 are transported in the region of the intermediate conveyor 51 as a diaper group 19 in an inclined downward direction and are transferred to the storage band 18. The imbricated relative position predetermined by the collecting wheel 46 is maintained in the region of the intermediate conveyor 51, in such a way that the diapers 10 of a diaper group 19 impinge one after the other on the storage band 18 between successive webs 20, specifically with the round edge 11 pointing downward. On account of the coordinated relative movement, to be precise due to the conveying movement of the storage band 18, the diapers 10 are deposited one after the other on the storage band 18.

The diaper groups 19 are predetermined even when the diapers run into the collecting wheel 46, specifically in each case by means of an empty unfilled pocket 50 of the collecting wheel, after the reception of a number of diapers 10 corresponding to the diaper group 19. The empty pocket 50 gives rise to a corresponding distance between successive diaper groups 19 even in the collecting wheel 46 and in the region of the intermediate conveyor 51, in such a way that the gaps are assigned to the webs 20 of the storage band 18.

To stabilize the diapers during transport through the collecting wheel 46, an outer guide is attached to the collecting wheel 46, to be precise a guide band 53 which bears with a guide run arcuately or circularly on the diapers 10 in the region of the collecting wheel 43.

The intermediate conveyor 51 consists of the supporting belt 52 which extends from an upper region of the collecting wheel 46 to the storage band 18. Opposite to the supporting belt 52, two counterbelts are provided as part of the transfer conveyor 49. An upper counterbelt 54 stabilizes the imbricated oblique position of the diapers 10. This is followed by a lower band, to be precise a pivoting belt 55, assigned to the storage band 18. Said pivoting belt is pivotable about a bearing 56 according to the double arrow. The supporting belt 52 or a lower belt leg 57 is pivotable together with the pivoting belt 56 about a pivot bearing in the region of a deflecting wheel 58. The joint pivoting movements of a lower region of the intermediate conveyor 51 are controlled such that, after the transfer of a diaper group 19 to the storage band 18, the first diaper 10 of the following diaper group 19 does not collide with the web 20.

The designs of the cooperating members in the region of the introduction station 16 are coordinated with one another so that the relative movements described can be carried out. As is clear particularly from FIG. 6 and FIG. 7, the webs 20 of the storage band 18 are narrow in relation to the width of the storage band 18 or a diaper 10. The webs 20 are arranged centrally with respect to the storage band 18, so that the diaper group 19 is supported centrally. Members for handling the diapers 10 take effect in the region of lateral projections, that is to say next to webs 20. The guide band or deflecting rollers of the latter are mounted on carrying struts 59 on both sides of the collecting wheel 46. Deflecting rollers 58 and further deflecting and driving rollers for belts of the intermediate conveyor 51 are likewise mounted on carrying struts 60 on both sides of the collecting wheel 46. The belts 52, 54, 55 of the intermediate conveyor 51 are arranged in pairs on both sides of the collecting wheel 46 and, in the lower region, on both sides of the webs 20, but in the range of movement of the diapers 10, so that these are picked up laterally by the pairs of belts.

The supply of the diapers 10 to the collecting wheel 46 and from this to the storage band 18 is checked by sensors, for example by light barriers or other contactless sensing members. In the transport path of the individual diapers 10 to the collecting wheel 46, the transfer conveyor 49 is preceded by an intermediate conveyor 61. This comprises two parallel belts, between which the diapers 10 are transported in a vertical plane. The intermediate conveyor 61 transfers the diapers 10 to the transfer conveyor 49 during an upwardly directed transport movement. In the region of the intermediate conveyor 61, a sensor 62 is arranged which triggers control or fault signals in the event of incorrect positions or a deficient supply of diapers 10. A further sensor 63 is arranged in the region of the transfer of the diapers 10 from the transfer conveyor 49 to the collecting wheel 46, in order to monitor the fault-free introduction of the diapers 10 to the pockets 50. The same purpose is served by a sensor 64 in the lower region of the intermediate conveyor 51, to be precise during the transfer of the diapers 10 to the storage band 18. The functioning of the sensors 62, 63, 64 and of further sensors is tailored, on the one hand, to detecting the passage of diapers 10, but, on the other hand, also to detecting the time intervals and controlling drives accordingly to the effect of acceleration or deceleration.

The introduction of the diapers 10 or diaper groups 19 into the store, that is to say the transfer to the storage band 18 in the region of the introduction station 16, is solved in a special way. The collecting wheel 46 and the following conveying members, that is to say the intermediate conveyor 51, are located in the plane (above) a rectilinear initial portion 65 of the storage band 18, to be precise of the conveying portion 21. The empty portion of the storage band is led out of a laterally offset movement plane in the region of the deflecting wheel 41 along an approximately S-shaped guide in a horizontal plane into the initial portion 65 (FIG. 8). This special run of the storage band 18 is brought about by deflecting pulleys 66, 67 rotatable about vertical axes, that is to say oriented in a horizontal plane. The (empty) storage band 18 is led successively and contradirectionally around the deflecting pulleys 66, 67 by means of upright webs 20, that is to say by means of deflection forming in a horizontal plane. The second deflecting pulley 67 in the direction of movement guides the storage band into the initial portion 65. The transfer of the diapers 10 or diaper groups 19 to the storage band 18 takes place at this location. The deflecting pulleys 66, 67, while having the same size, are arranged with offset vertical axes of rotation and are connected to the common carrying framework via holding members.

In plan view, therefore, the storage band 18 forms in the region of the introduction station 16 an offset in the horizontal direction, in that the storage band 18 is guided into the loading plane by the offset deflecting rollers 40, 41. On the one hand, this gives rise to the space required for attaching the members for supplying the diapers 10 to the storage band 18, that is to say, in particular, for the collecting wheel 46 and the intermediate conveyor 51. The lower discharge end of this conveyor for transferring the diapers 10 directly to the storage band is positioned such that a reception end of the initial portion 65 is exposed in the region of transfer of the diapers, since, here, the storage band 18 is supplied and introduced laterally into the plane or direction of the initial portion 65.

A further particularity is the configuration in the region of the discharge conveyor station 17. The diapers 10 or diaper groups 19 are extracted from the main store 15 in the rectilinear continuation of an upper storage turn 34. For this purpose, the storage band is led with a rectilinear end portion 68 out of the storage unit 32 and is subsequently guided via a deflection device, according to FIG. 8, with deflecting pulleys 66, 67 in an S-shaped manner in a horizontal plane and is then transferred to the deflecting wheel 44, in a corresponding carry-over of the solution according to FIG. 8. On the one hand, the transfer of the diapers to the discharge conveyor 69 in a rectilinear continuation of the conveying direction of the storage band 18 is thereby facilitated. On the other hand, however, space is likewise provided for the discharge conveyor means 69, 74 by the S-shaped deflection of the storage band.

The in this lower lower guidance, assigned to the storage unit 32, of the storage band 18 with a laterally directed offset corresponds to matching deflections in the region of the entry side of the storage unit 33, on the one hand, and of the exit side, on the other hand. There, too, in each case S-shaped guides of the storage band 18 are provided by means of deflecting members or deflecting pulleys 66, 67 in the arrangement similar to FIG. 8.

The rectilinear end portion 68 is followed by a special discharge conveyor 69. This transports the diapers 10 out of the region of the storage unit 32, with the group structure being maintained. In the present exemplary embodiment, the discharge conveyor 69 is directed obliquely upward. The diapers 10 are directed obliquely with respect to the plane of the discharge conveyor 69, with the upright position being maintained.

The discharge conveyor 69 is designed in a special way. Two belts 70 arranged at a distance from one another are provided as a lower conveyor and support the diapers laterally in the region of the downwardly directed edges. On account of the distance between the belts 70, the webs 20 can be moved between the belts 70, so that a flowing transfer of the diapers takes place. The diapers are in this case lifted off by the discharge conveyor 69 or by the belts 70 from the storage band 18 which runs further on in a horizontal plane. A guide wedge 78 is provided as an additional lead-over member and supplies the diapers to the discharge conveyor 69 by means of the transport movement of the storage band 18. In addition, the diapers 10 are laterally guided and supported in the region of the discharge conveyor 69. For this purpose, the discharge conveyor 69 has driven supporting belts 71, 72 running on both sides of the path of movement of the diapers 10. In the present case, in each case two supporting belts 71, 72 are arranged at a distance from one another on both sides of the stream of successive diapers, specifically in the version as round cords. Conveying runs facing one another bear on the laterally directed edges of the diapers 10. The supporting belts 71, 72 run via correspondingly positioned double rollers 73.

The diaper groups 19, after emerging from the main store 15, are opened up. Individual diapers 10 are supplied at a distance from one another to the packer 14 or to an assembly for composing packing groups of diapers 10.

For this purpose, the diapers 10 are transferred individually at the end of the discharge conveyor 69 to a connecting conveyor 74. This consists of two parallel belts, between the conveying runs of which the diapers are held. The connecting conveyor 74 is arranged vertically. The diapers 10, therefore, after the discharge conveyor 69, are conveyed downward. A particularity is the transfer of the individual diapers 10 from the discharge conveyor 69 to the connecting conveyor 74. A transfer assembly 75 consists of a bearing member, lying opposite the end of the discharge conveyor 69, for the front diaper 10 in each case. This member is arranged above the belts of the connecting conveyor 74 such that the diapers 10 are introduced into the region between the belts. For this purpose, the transfer assembly 75 consists of a suction belt 76, of which the vertical run facing the diapers 10 bears against a suction box 77 loaded with a vacuum. The in each case free front diaper 10 is therefore picked up by the loaded suction belt 76 and transported downward into the initial region of the belts of the connecting conveyor 74. By the suction belt 76 being vented, the diaper 10 is freed and is taken over by the connecting conveyor 74. The transfer assembly 75 or a unit with the suction belt 76 is movable transversely by means of a crank mechanism. The in each case free diaper 10 is picked up by the suction belt 76 in the region of the discharge conveyor 69. As a result of the transverse movement, the diaper 10 bearing on the suction belt 76 passes into the discharge conveying plane defined by the connecting conveyor 74.

The diapers 10 transported downward by the connecting conveyor 74 to a lower plane are deflected into a horizontal conveying plane in the direction of the packer 14. For this purpose, the connecting conveyor 74 is followed at the bottom by a deflecting conveyor 79. This consists of two endless belts which are guided by deflecting rollers in such a way that the path of conveyance for the diapers 10 is deflected through 90°.

The deflecting conveyor 79 is followed by a horizontal conveyor 80. This consists of a plurality of successive pairs of belts 81, 82, 83 with horizontal conveying runs above and below the path of movement of the diapers 10. These pairs of belts 81, 82, 83 form a continuous conveyor which, however, because of separate drives of the pairs of belts 81, 82, 83, allows actions upon the transport of the diapers. Each of the pairs of belts is assigned a sensor 84. It is thereby possible to detect any variation in the supply of the diapers, in particular the distances and conveying speeds, and to influence these. Further sensors 85 are located in the entry region of the connecting conveyor 74, on the one hand, and of the deflecting conveyor 79, on the other hand.

After the horizontal conveyor 80, the diapers 10 are supplied to a collecting conveyor 86. A lower collecting belt 87 receives the diapers 10 on a curved upper run 88. The relative movement of the collecting conveyor 86 with respect to the arriving diapers is such that these are deposited on the upper run 88 with a reciprocal overlap, that is to say in an imbricated manner. The diapers 10 are supplied to the packer 14 in this formation, to be precise as a group of diapers 10 arranged in an imbricated manner, in order to form a group corresponding to the contents of a package.

As a particularity, the store or main store 15 is assigned a further store, to be precise an additional store 89. This may also be used independently of or alternatively to the main store 15.

The additional store 89 is positioned in the region of the supply of the diapers 10 coming from the converter 13. The arrangement is such that, alternatively or additionally to the converter 13, diapers can be introduced from the additional store 89 into the conveying flow. The additional store 89 serves for the possibly necessary supplementary introduction of diapers 10 in addition to the converter 13. With the aid of the additional store 89, however, diapers 10 can even be introduced into the main store 15 without a converter 13, in particular for running in the main store 15.

The additional store consists of an (endless) storage conveyor or storage belt 90. This forms an upper conveying portion 91 and a lower conveying portion 92. The endless conveyor or endless conveyors of the additional store 89 runs or run via deflecting rollers 93, 94. These are mounted on a carrying framework with two parallel bearers 95 arranged at a distance from one another.

In this exemplary embodiment, the storage belt 90 consists of two parallel individual belts 96, 97 which are guided in parallel at a distance from one another and which run via correspondingly designed deflecting rollers 93, 94. Each individual belt 96, 97 has holding webs 98, 99 which, analogously to the webs 20, are arranged at a distance from one another in the conveying direction and form receptacles in each case for a diaper group 19. The latter may correspond to or, alternatively, differ from the diaper groups 19 of the main store 15 in terms of the number of diapers 10. The holding webs 98, 99 pick up the diapers 10 in each case in a marginal region.

The additional store 89 may be loaded with diapers in various ways. In the present exemplary embodiment, manual loading is carried out. Two loading stations are set up, in which in each case a complete diaper group 19, while being pressed together laterally, is introduced into a receptacle between adjacent pairs of holding webs 98, 99, specifically in the region of the upper conveying portion 91. In this region, the diapers are held by lateral guides, specifically by guide walls 100, 101. These terminate in the region of the deflection of the storage belt 90. In this region, the diapers are held at their upper boundaries, in this case at the upwardly directed round edges 11, on the storage belt 90 by means of a deflecting guide 102. The deflecting guide 102 merges into an underguide 103 in the region of the lower conveying portion 92. The diapers rest with a downwardly directed diaper edge, that is to say with the round edge 11, on the underguide 103 designed as a thin wall. In addition, a lateral guide 104 is mounted on both sides of the diapers in the region of deflection and of the lower conveying portion 92, approximately at diaper midheight. This is a guiderail.

The diapers 10 of the additional store 89 are introduced, additionally to the output of the converter 13 or alternatively to this, into the conveying stream of diapers to the main store 15 and/or to the packer 14. In the present exemplary embodiment, the converter 13, on the one hand, and the additional store 89, on the other hand, are assigned two transport tracks for the diapers 10, which transport tracks are directed upward by deflection out of an essentially horizontal initial position. Conveying units 105 from the converter 13 and 106 from the additional store 89 converge in a common transport track, specifically in the upwardly directed transfer conveyor 49 or into the preceding intermediate conveyor 61. Each conveying unit 105, 106 consists of a plurality of pairs of belts 107, 108 and 109, 110 arranged in each case at an angle to one another in the transport direction. The diapers 10 are transported in each case under tension between mutually facing conveying runs of the pairs of belts 107, 108, 109, 110 and are finally transferred to the intermediate conveyor 61 or to a preceding vertical pair of belts, to be precise to a preconveyor 111. This is likewise arranged in a vertical position. The pairs of belts 108, 110 converge in the region of the preconveyor 111. A wedge-shaped guide piece 112 ensures the transfer of the diapers 10 coming from two conveying directions onto the preconveyor 111. The diapers 10, here, are conveyed with the round edge 11 lying in front in the transport direction. The above-described conveyors of the conveying units 105, 106 are equipped with sensors 113 for the reasons described.

A further particularity is the transfer of diapers 10 out of the additional store 89 to a discharge conveyor. At an exit end of the additional store 89, an extraction station is formed, here in the region of the lower conveying portion 92 at the deflecting roller 94. The diaper 10 which is in each case at the front is discharged downward and, being deflected, is deposited on a reception belt 114. This is arranged in an oblique position here, with an upwardly directed transport plane to the conveying unit 106 and is preferably designed as a suction conveyor. The diapers 10 are transported away downward out of the additional store 89 individually, that is to say with the diaper group 19 being opened up, and pass via a guide duct 115 onto the reception belt 114. The guide duct 115 is deflected arcuately in a part region. The extraction of the diapers from the additional store 89 is assisted by a conveying member, specifically by a suction conveyor 116. A belt of the suction conveyor 116 is guided triangularly via deflecting rollers. A lower, driven deflecting roller 117 of larger diameter steers an upright conveying run 118 into the region of the reception belt 114. The conveying run 118 bears on a suction box 119 which follows the arcuate run of the guide duct 115 as far as the reception belt 114. The diaper 10 picked up by the suction conveyor 116 is therefore transported in the downward direction and deposited on the reception belt 114. In the region of the latter, a transfer member is mounted for transferring the diaper 10 onto the reception belt 114, specifically a blow nozzle 120 directed onto the topside of the diaper 10. The suction air of the conveying run 118 is ineffective here.

The suction conveyor 116 or its conveying run 118 is movable transversely, specifically by means of a crank mechanism 121. This moves the suction conveyor 116 in the direction of the arriving diapers 10 until the suction conveyor 116 or the conveying run 118 comes to bear on the diaper 10 which in each case lies in front. The contradirectional movement brings the picked-up diaper 10 into the discharge position, that is to say above the guide duct 115. The suction conveyor 116 is driven intermittently, that is to say is moved in the discharge direction of the diaper 10 when this position is reached.

The functioning of this discharge conveying unit is checked by means of a sensor 122 in the region of the reception belt 114. The device may be employed for the handling of flat articles, in particular diapers 10, and also for other fields of use.

LIST OF REFERENCE SYMBOLS

10 Diaper
11 Round edge
12 Leg margin
13 Converter
14 Packer
15 Main store
16 Introduction station
17 Discharge conveyor station
18 Storage band
19 Diaper group
20 Web
21 Conveying portion
22 Return portion
23 Deflection unit
24 Deflection unit
25 Deflection unit
26 Deflection unit
27 Arm
28 Longitudinal bearer
29 Longitudinal bearer
30 Slide
31 Slide
32 Storage unit
33 Storage unit
34 Storage turn
35 Empty turn
36 Bearer
37 Deflecting wheel
38 Band portion
39 Band portion
40 Deflecting wheel
41 Deflecting wheel
42 Servomotor
43 Deflecting wheel
44 Deflecting wheel
45 Servomotor
46 Collecting wheel
47 Partition
48 Wheel disk
49 Transfer conveyor
50 Pocket
51 Intermediate conveyor
52 Supporting belt
53 Guide band
54 Counter band
55 Pivoting belt
56 Bearing
57 Belt leg
58 Pivot bearing
59 Carrying strut
60 Carrying strut
61 Intermediate conveyor 62 Sensor
63 Sensor
64 Sensor
65 Initial portion
66 Deflecting pulley
67 Deflecting pulley
68 End portion
69 Discharge conveyor
70 Belt
71 Supporting belt
72 Supporting belt
73 Double roller
74 Connecting conveyor
75 Transfer assembly
76 Suction belt
77 Suction box
78 Guide wedge
79 Deflecting conveyor
80 Horizontal conveyor
81 Pair of belts
82 Pair of belts
83 Pair of belts
84 Sensor
85 Sensor
86 Collecting conveyor
87 Collecting belt
88 Upper run
89 Additional store
90 Storage belt
91 Conveying portion
92 Conveying portion
93 Deflecting roller
94 Deflecting roller
95 Bearer
96 Individual belt
97 Individual belt
98 Holding web
99 Holding web
100 Guide wall
101 Guide wall
102 Deflecting guide
103 Underguide
104 Lateral guide
105 Conveying unit
106 Conveying unit
107 Pair of belts
108 Pair of belts
109 Pair of belts
110 Pair of belts
111 Preconveyor
112 Guide piece
113 Sensor
114 Reception belt
115 Guide duct
116 Suction conveyor
117 Deflecting roller
118 Conveying run
119 Suction box
120 Blow nozzle
121 Crank mechanism
122 Sensor

What is claimed is:

1. A device for handling diapers (10), which, coming from a converter (13) as a production machine, are supplied to a packer (14) as a packaging machine for the packaging of groups of diapers (10), comprising:

a) a continuous-flow main store (15) located after the converter (13), through which the diapers (10) are conveyed, the main store (15) being a first-in/first-out store of variable storage capacity;

b) an endless diaper conveyor on the main store (15), the endless diaper conveyor being a storage band (18) having transversely directed webs (20) as supporting or separating members for supporting a diaper group (19) consisting of a plurality of the diapers (10) arranged upright on the storage band (18); and c) a collecting wheel (46) at an introduction station (16) located between the main store (15) and the converter (13), the collecting wheel (46) being a collecting member for the diapers (10), the collecting wheel (46) having pockets (50) arranged along the circumference and delimited from one another by partitions (47), with each of the pockets (50) for receiving one of the diapers (10), wherein the diapers (10) are taken over by the collecting wheel (46) for transfer to the storage band (18) by means of an intermediate conveyor (51) and the diapers (10) are deposited from above onto the storage band (18).

2. The device as claimed in claim 1, wherein the storage band (18) consists of a conveying chain that can be deflected in two directions, a first direction being in the plane of the storage band (18) and a second direction being transverse to the plane of the storage band (18).

3. The device as claimed in claim 1, wherein the main store (15) consists of two storage units (32, 33) which are formed in elongate turns, so as to form storage turns (34) in each storage unit (32, 33), a first lower storage unit (32) for receiving the diapers (10), and a second storage unit (33), arranged above the first storage unit (32), consisting of empty turns (35) and forming a return portion (22) of the storage band (18).

4. The device as claimed in claim 3, wherein each of the storage units (32, 33) has at least two deflection units (23, 24; 25, 26), wherein one deflection unit (24, 26) is mounted on a vertical axis and is displaceable transversely relative to the axis and wherein the other deflection unit (23, 25) is fixedly mounted rotatably, the displaceable deflection units (24, 26) being correspondingly movable contradirectionally, in such a way that a change in the effective length of a conveying portion (21) of the storage band (18) corresponds to an opposite change in the length of the return portion (22).

5. The device as claimed in claim 3, wherein the deflection units (23, 24; 25, 26) of the storage units (32, 33) comprise cylindrical bearer (36) and of deflecting wheels (37) arranged on the cylindrical bearer (36) in the transversely axial plane, the storage turns (34) and empty turns (35) being in a horizontal plane on one side of the storage unit (32, 33) and ascending obliquely on the opposite side.

6. The device as claimed in claim 4, wherein the displaceable deflection units (24, 26) are connected to one another by a rigid arm (27) connection means, and are movable by means of a slide (30, 31) on a guide or on a longitudinal bearer (28, 29) on an opposite, lower side and an upper side, respectively.

7. The device as claimed in claim 1, wherein the diapers (10) are supplied to the main store (15) in the region of a rectilinear initial portion (65) of the storage band (18) by means of the transfer of the diaper groups (19) supplied at a distance from one another according to the reception between successive webs (20) of the storage band (18).

8. The device as claimed in claim 1, wherein the diapers (10) are supplied individually from below, in succession and at a distance from one another, to the collecting wheel (46) rotating continuously in a vertical plane by means of a transfer conveyor (49) which conveys in the upward direction and which is directed approximately tangentially with respect to the collecting wheel (46), in such a way that the diapers (10) are introduced in each case from below into a pocket (50) directed in an extension of the transfer conveyor (49).

9. The device as claimed in claim 1, wherein the storage band (18) is guided in the region of the introduction station (16), coming from the storage unit (33), via two deflecting wheels (40, 41), an upper deflecting wheel (40) and a lower deflecting wheel (41), which are arranged one above the other and are rotatable about horizontal axes and which, after the lower deflecting wheel (41), steer the storage band (18) into a horizontal conveying plane, and also after the deflecting wheel (41) the storage band (18) runs with a lateral offset, in particular in an S-shape manner, and merges in the region of the intermediate conveyor (51) into the rectilinear initial portion (65) by deflection via correspondingly arranged horizontal deflecting pulleys (66, 67).

10. The device as claimed in claim 1, wherein the diapers (10) are extracted in the region of a discharge conveyor station (17), from an upper storage turn (34) of the storage unit (32) by means of a discharge conveyor (69) which follows the storage turn (34) and which discharges the diapers (10) as a diaper group (19) and supplies them to a transfer assembly (75) for the individual separation of the diapers (10).

11. The device as claimed in claim 10, wherein, at the end of the discharge conveyor (69), the diapers (10) are supplied individually in succession by means of the transfer assembly (75) to a downwardly conveying connecting conveyor (74) consisting of two cooperating belts.

12. The device as claimed in claim 11, wherein the diapers (10), which are conveyed downward by the connecting conveyor (74), are deflected into a horizontal conveying direction by means of a deflecting conveyor (79) consisting of two belts, after the deflecting conveyor (79) are located a plurality of pairs of belts (81, 82, 83) which succeed one another in the conveying direction, in each case with an independent drive, for transporting the diapers (10) in order to transfer the diapers (10) to the packer (14) or to a collecting assembly preceding the packer (14).

13. The device as claimed in claim 9, wherein, after the storage unit (32), the storage band (18) is guided in an S-shaped manner in a horizontal plane and then runs in an upward direction via a deflecting wheel (44), the storage band in each case being correspondingly guided in an S-shaped manner in the region of the storage unit (33), at the same time being oriented with respect to the deflecting rollers (40, 41, 43, 44) which are arranged one above the other in pairs and are arranged approximately centrally with respect to the storage units (32, 33).

14. The device as claimed in claim 10, wherein the discharge conveyor (69) following the storage unit (32) is formed from two belts (70), arranged at a distance from one another and conveying upward in an oblique plane, and from lateral supporting conveyors with two supporting belts (71, 72) acting on both sides of the diapers (10).

15. The device as claimed in claim 1, further comprising an additional store (89) which can be used alternatively or additionally to the main store (15), which comprises a storage belt (90) revolving in a vertical plane with an upper horizontal conveying portion (91) and with a lower conveying portion (92), wherein the diapers (10) or the diaper groups (19) are deposited on the storage belt (90) in the region of the upper conveying portion (91).

16. The device as claimed in claim 15, wherein the additional store (89) or the storage belt (90) has two transversely directed holding webs (98) for the delimitation of receptacles for the diaper group (19) arranged at a distance from one another in the transverse direction, in each case on an individual belt (96, 97) of the storage belt (90).

17. The device as claimed in claim 15, wherein, on account of the conveying movement of the storage belt (90), the diapers (10) are conveyed by deflection from the upper conveying portion (91) into the lower conveying portion (92), wherein in the region of the lower conveying portion (92) the diapers (10) are supported with a downwardly directed edge (11), upright on a lower underguide (103).

18. The device as claimed in claim 15, wherein, in the region of the additional store (89), individual diapers (10) of a row of diapers (10) supplied closely together are extracted by means of an extraction assembly and are supplied to a reception belt (114) in the region of the lower conveying portion (92) of the additional store (89), wherein the diapers (10) are discharged individually from the close-together position by means of a downward movement.

19. The device as claimed in claim 18, wherein the member for extracting the diapers (10) from the close-together position comprises a suction conveyor (116) which in each case receives a diaper (10) in the region of a conveying run (118) and discharges the diaper (10) into a downwardly directed guide duct (115) which leads to the reception belt (114), wherein the suction conveyor (116) is movable transversely between a reception position for a diaper (10) and a discharge position in the region of the guide duct (115).

20. The device as claimed in claim 15, wherein transport units (105, 106) can be transported from the converter (13) and from the additional store (89), respectively, to a common vertically conveying conveyor (111) which is followed by conveyors to the collecting wheel (46).

* * * * *